US012218496B2

(12) United States Patent
Nishino et al.

(10) Patent No.: US 12,218,496 B2
(45) Date of Patent: Feb. 4, 2025

(54) ENCODER HAVING OVERVOLTAGE BREAKDOWN PREVENTION CIRCUIT

(71) Applicant: FANUC CORPORATION, Yamanashi (JP)

(72) Inventors: Shouhei Nishino, Yamanashi (JP); Youhei Kondou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 174 days.

(21) Appl. No.: 18/040,801

(22) PCT Filed: Sep. 7, 2021

(86) PCT No.: PCT/JP2021/032895
§ 371 (c)(1),
(2) Date: Feb. 6, 2023

(87) PCT Pub. No.: WO2022/054809
PCT Pub. Date: Mar. 17, 2022

(65) Prior Publication Data
US 2023/0307904 A1    Sep. 28, 2023

(30) Foreign Application Priority Data
Sep. 14, 2020  (JP) ................................ 2020-153663

(51) Int. Cl.
*H02H 7/20*  (2006.01)
*G01D 5/244*  (2006.01)
*H02H 1/00*  (2006.01)

(52) U.S. Cl.
CPC .......... *H02H 7/20* (2013.01); *G01D 5/24466* (2013.01); *H02H 1/0007* (2013.01)

(58) Field of Classification Search
CPC ............ H02H 7/20; H02H 3/20; H02H 3/202
See application file for complete search history.

(56) References Cited

U.S. PATENT DOCUMENTS

| 2004/0181958 A1 | 9/2004 | Rodi | |
|---|---|---|---|
| 2018/0372514 A1* | 12/2018 | Nisino | ............... G01D 5/24457 |
| 2019/0260223 A1* | 8/2019 | Kondou | ................... H02J 9/06 |

FOREIGN PATENT DOCUMENTS

| JP | 2007288970 A | 11/2007 |
|---|---|---|
| JP | 2007292608 A | 11/2007 |
| JP | 2008216115 A | 9/2008 |

(Continued)

*Primary Examiner* — Jared Fureman
*Assistant Examiner* — Christopher J Clark
(74) *Attorney, Agent, or Firm* — HAUPTMAN HAM, LLP

(57) ABSTRACT

This encoder comprises: an encoder main circuit that is driven using an encoder main circuit driving voltage supplied from at least one internal power source to generate rotation information of a rotating element; an overvoltage breakdown prevention circuit that generates an abnormality detection unit driving voltage on the basis of a voltage supplied from a main power source; an abnormality detection unit that is driven using the abnormality detection unit driving voltage outputted from the overvoltage breakdown prevention circuit to detect an abnormality related to the internal power source; and a cut-off circuit that cuts off supply of the encoder main circuit driving voltage from the internal power source to the encoder main circuit upon detection by the abnormality detection unit of an abnormality.

7 Claims, 7 Drawing Sheets

(56) References Cited

FOREIGN PATENT DOCUMENTS

| | | |
|---|---|---|
| JP | 20102267 A | 1/2010 |
| JP | 2013108884 A | 6/2013 |
| JP | 2017122689 A | 7/2017 |
| JP | 20197831 A | 1/2019 |
| JP | 2019144080 A | 8/2019 |

* cited by examiner

ENCODER HAVING OVERVOLTAGE BREAKDOWN PREVENTION CIRCUIT

RELATED APPLICATIONS

The present application is a National Phase of International Application No. PCT/JP2021/032895 filed Sep. 7, 2021, which claims priority to Japanese Application No. 2020-153663, filed Sep. 14, 2020.

TECHNICAL FIELD

The present invention relates to an encoder having an overvoltage breakdown prevention circuit.

BACKGROUND ART

An encoder is used to detect rotation information of a rotary body such as a rotary shaft of a motor provided in a machine tool, a robot or the like, or a movable part of a robot. A main circuit in an encoder (hereinafter referred to as "encoder main circuit") is supplied with electric power from a plurality of power supplies. For example, as an electronic component constituting the encoder main circuit, there is a memory that stores detected position information, origin information or the like of the motor, rotary shaft or the like. In order to keep the information stored in the memory, electric power is supplied from a main power supply. In addition, at a time of the end of operation or at a time of occurrence of power outage of the machine tool, robot or the like in which the encoder is provided, electric power is supplied from a backup power supply since the information stored in the memory in the encoder is lost if the supply of power from the main power supply to the encoder is stopped.

For example, there is known an absolute encoder that includes a backup power supply and is configured to detect and store position information of a detection target by electric power from the backup power supply when the supply of power from a main power supply is shut off, the absolute encoder further including a voltage regulator that regulates an output voltage from the backup power supply to a predetermined voltage, and a voltage abnormality information storage device that operates at the predetermined voltage, wherein the voltage abnormality information storage device monitors the output voltage of the backup power supply while the main power supply is in an OFF state, stores, when detecting a deviation of the output voltage of the backup power supply from a predetermined range, the deviation as voltage abnormality information, and outputs the stored voltage abnormality information to an outside when the main power supply enters an ON state (see, for example, PTL 1).

For example, there is known a backup power supply for an absolute encoder, the backup power supply being configured to supply electric power to the absolute encoder in order to enable the absolute encoder to execute at least either a position detection operation of a control target device or storage of position information, when a power supply of a control device that controls the control target device is in an OFF state, the backup power supply including a secondary battery, a charging circuit that charges the secondary battery, an auxiliary battery, and a power supply switching circuit, wherein when an output voltage of the secondary battery is a predetermined value or more, the power supply switching circuit selects an output of the secondary battery and outputs the output of the secondary battery to the absolute encoder, and when the output voltage of the secondary battery is lower than the predetermined value, the power supply switching circuit selects an output of the auxiliary battery and outputs the output of the auxiliary battery to the absolute encoder (see, for example, PTL 2).

For example, there is known a backup power supply for an absolute encoder, the backup power supply including an abnormality detection function of at least one of a secondary battery and a charging circuit, the backup power supply being configured to supply electric power to the absolute encoder in order to enable the absolute encoder to execute at least either a position detection operation of a control target device or storage of position information, when a power supply of a control device that controls the control target device is in an OFF state, the backup power supply including the secondary battery, the charging circuit that charges the secondary battery, and an abnormal state detection circuit that detects an abnormal state of at least one of the secondary battery and the charging circuit, wherein when the abnormal state detection circuit detects an abnormality of at least one of the secondary battery and the charging circuit, an output voltage of the backup power supply is changed to a voltage at which the absolute encoder detects a backup voltage abnormal state (see, for example, PTL 3).

For example, there is known an encoder including a backup power supply device that supplies electric power to an encoder when a main power supply of the encoder is in an OFF state, the backup power supply device including two systems of batteries including a main battery and a sub-battery, wherein the backup power supply device supplies electric power to the encoder from the main battery after a power supply of the encoder is switched from the main power supply to the backup power supply device, and switches a battery that supplies electric power to the encoder from the main battery to the sub-battery when a voltage level of the main battery lowers to a predetermined voltage level that requires switching of the battery (see, for example, PTL 4).

CITATION LIST

Patent Literature

[PTL 1] Japanese Unexamined Patent Publication (Kokai) No. 2008-216115
[PTL 2] Japanese Unexamined Patent Publication (Kokai) No. 2007-292608
[PTL 3] Japanese Unexamined Patent Publication (Kokai) No. 2007-288970
[PTL 4] Japanese Unexamined Patent Publication (Kokai) No. 2010-002267

SUMMARY OF INVENTION

Technical Problem

In an encoder that is driven by receiving supply of power from a plurality of power supplies, when power supplies with different output voltages are short-circuited, there is a possibility that overvoltage is supplied to an encoder main circuit, and that an electronic component constituting the encoder main circuit is broken down. In order to prevent such breakdown of the encoder main circuit, some of the power supplies are set as monitoring-target power supplies and output voltages thereof are always monitored by an abnormality detection circuit, and when an abnormal voltage is detected, power supply from the monitoring-target power supply is shut off by a shutoff circuit. Since the power supply from the monitoring-target power supply is shut off when an abnormality occurs, the abnormality detection circuit is operated by receiving power supply from a main power supply that is a different system from the monitoring-target power supply. However, also when the power supply that supplies power to the abnormality detection circuit and the monitoring-target power supply are short-circuited, overvoltage is supplied to the encoder main circuit and the electronic component constituting the encoder main circuit is broken down. Thus, as regards the encoder that is driven by receiving supply of power from a plurality of power supplies, there is a problem that it is difficult to prevent breakdown of the encoder main circuit due to a power supply abnormality including short-circuit. Accordingly, as regards the encoder that is driven by receiving supply of power from power supplies, there is a demand for a technology that can surely prevent the breakdown of the encoder main circuit by overvoltage due to a power supply abnormality.

Solution to Problem

According to one mode of the present disclosure, an encoder includes at least one internal power supply configured to generate an encoder main circuit driving voltage and output the encoder main circuit driving voltage; an encoder main circuit configured to be driven by using the encoder main circuit driving voltage supplied from the internal power supply, and to generate rotation information of a rotary body; an overvoltage breakdown prevention circuit configured to generate an abnormality detection unit driving voltage, based on a voltage supplied from a main power supply, and output the abnormality detection unit driving voltage; an abnormality detection unit configured to be driven by using the abnormality detection unit driving voltage that is output from the overvoltage breakdown prevention circuit, and to detect an abnormality relating to the internal power supply; and a shutoff circuit configured to shut off supply of the encoder main circuit driving voltage to the encoder main circuit by the internal power supply, at a time of abnormality detection by the abnormality detection unit.

Advantageous Effects of Invention

According to one mode of the present disclosure, in an encoder that is driven by receiving supply of power from a plurality of power supplies, the breakdown of an encoder main circuit by overvoltage due to a power supply abnormality can surely be prevented.

DESCRIPTION OF EMBODIMENTS

Figure 1:
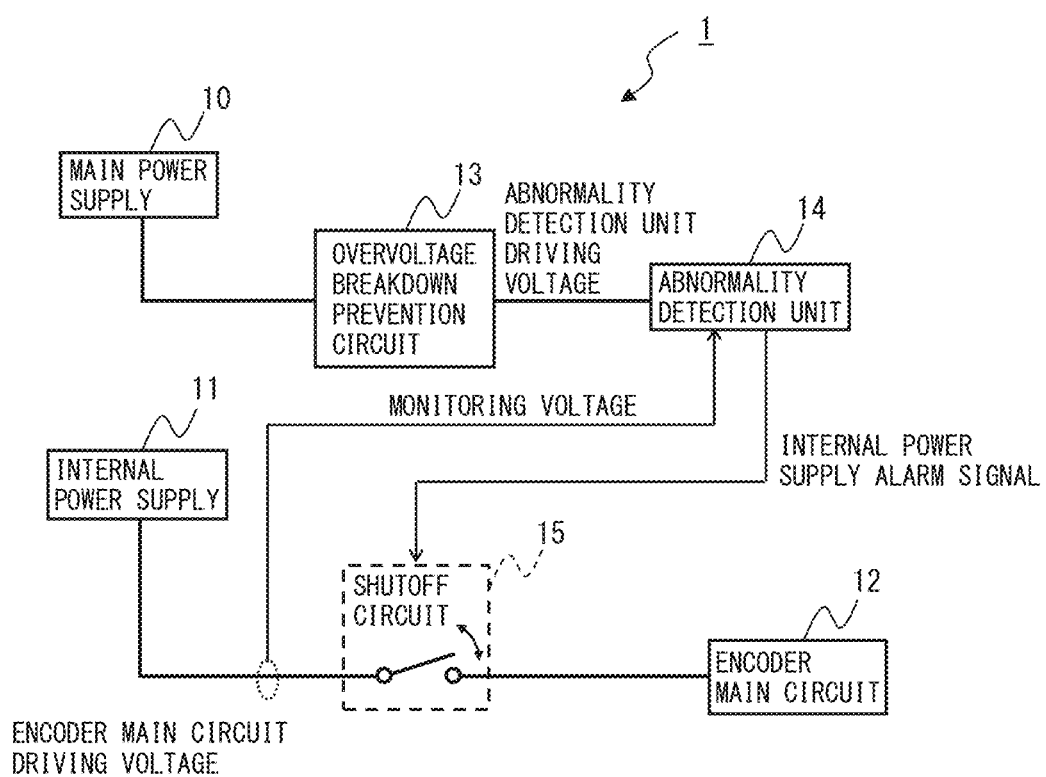
FIG. 1 is a view illustrating an encoder according to a first embodiment of the present disclosure.

Hereinafter, an encoder including an overvoltage breakdown prevention circuit is described with reference to the drawings. In the drawings, similar members are denoted by like reference signs. For the purpose of easier understanding, the scale in the drawings is changed as appropriate. A mode illustrated in each drawing is an example for implementation, and the mode is not limited to the illustrated one.

An encoder according to an embodiment of the present disclosure is attached to, for example, a rotary body such as a rotary shaft of a motor provided in a machine tool, a robot or the like, or a movable part of a robot, and generates rotation information such as a rotational position or a rotational speed of the rotary body. The encoder according to the embodiment of the present disclosure may be of an optical type or of a magnetic type. The encoder according to the embodiment of the present disclosure is driven, based on electric current supplied by a power supply, and the power supply that outputs electric current for driving the encoder includes a main power supply and an internal power supply.

An encoder according to an embodiment of the present disclosure includes at least one internal power supply configured to generate an encoder main circuit driving voltage and output the encoder main circuit driving voltage; an encoder main circuit configured to be driven by using the encoder main circuit driving voltage supplied from the internal power supply, and to generate rotation information of a rotary body; an overvoltage breakdown prevention circuit configured to generate an abnormality detection unit driving voltage based on a voltage supplied from a main power supply and output the abnormality detection unit driving voltage; an abnormality detection unit configured to be driven by using the abnormality detection unit driving voltage that is output from the overvoltage breakdown prevention circuit, and to detect an abnormality relating to the internal power supply; and a shutoff circuit configured to shut off supply of the encoder main circuit driving voltage to the encoder main circuit by the internal power supply, at a time of abnormality detection by the abnormality detection unit.

To begin with, an encoder according to a first embodiment of the present disclosure is described with reference to FIG. 1.

FIG. 1 is a view illustrating the encoder according to the first embodiment of the present disclosure.

An encoder 1 according to the first embodiment of the present disclosure includes a main power supply 10, an internal power supply 11, an encoder main circuit 12, an overvoltage breakdown prevention circuit 13, an abnormality detection unit 14, and a shutoff circuit 15.

The main power supply 10 is configured, for example, as a power supply to which electric power is supplied from an outside via an external connection terminal provided on the encoder 1. Alternatively, the main power supply 10 may be composed of a primary battery or a secondary battery provided in the inside of the encoder 1. However, when the main power supply is composed of a primary battery or a secondary battery, the main power supply is treated as being distinguished from the internal power supply that is composed of a primary battery or a secondary battery. A voltage that is output by the main power supply 10 is, for example, 5 [V].

The internal power supply 11 generates an encoder main circuit driving voltage and outputs the encoder main circuit driving voltage. The internal power supply 11 supplies electric power to the encoder main circuit 12 by a system different from the main power supply 10, and is composed of, for example, a primary battery, a secondary battery, a power supply supplied with electric power from an outside via an external connection terminal provided on the encoder 1, or a voltage regulator that generates a constant voltage, based on a voltage supplied from the main power supply 10. The encoder main circuit driving voltage, which the internal power supply 11 outputs, is, for example, 3.3 [V], 1.5 [V], or 1 [V].

The encoder main circuit 12 is driven by using the encoder main circuit driving voltage that is supplied from the internal power supply 11, and generates the rotation information of the rotary body. The components constituting the encoder main circuit 12 include, for example, an optical or magnetic sensor unit attached to the rotary body, a signal conversion unit that converts an analog signal, which is output from the sensor unit, to a rectangular-wave signal, and a memory that stores the position information, origin information or the like of the motor, rotary shaft or the like, but an illustration thereof is omitted here. The signal conversion unit, which is one structural component of the encoder main circuit 12, is composed of a comparator that compares the analog signal, which is output from the sensor unit, with a reference voltage, and that outputs a pulse when the analog signal is greater than the reference voltage. In addition, when the encoder 1 is constituted as an optical encoder, the sensor unit, which is one structural component of the encoder main circuit 12, includes a light emission element and a light reception element. When the encoder 1 is constituted as a magnetic encoder, the sensor unit, which is one structural component of the encoder main circuit 12, includes a sensor head.

The overvoltage breakdown prevention circuit 13 generates an abnormality detection unit driving voltage based on the voltage supplied from the main power supply 10 and outputs the abnormality detection unit driving voltage. In particular, according to the first embodiment, based on the voltage supplied from the main power supply 10, the overvoltage breakdown prevention circuit 13 generates an abnormality detection unit driving voltage having a substantially equal magnitude to the encoder main circuit driving voltage and outputs it. The voltage supplied from the main power supply 10 has a different magnitude from the encoder main circuit driving voltage supplied from the internal power supply 11. Thus, the overvoltage breakdown prevention circuit 13 is configured to convert the input voltage to a voltage of a different magnitude, and to output the voltage of the different magnitude, and is composed of, for example, a voltage-division resistor, a voltage regulator or the like. For example, when the encoder main circuit driving voltage that is output by the internal power supply 11 is, e.g., 3.3 [V], the overvoltage breakdown prevention circuit 13 generates an abnormality detection unit driving voltage of about 3.3 [V], based on the voltage (e.g., 5 [V]) that is output by the main power supply 10, and outputs the abnormality detection unit driving voltage. When the encoder main circuit driving voltage that is output by the internal power supply 11 is, e.g., 1.5 [V], the overvoltage breakdown prevention circuit 13 generates an abnormality detection unit driving voltage of about 1.5 [V], based on the voltage (e.g., 5 [V]) that is output by the main power supply 10, and outputs the abnormality detection unit driving voltage. When the encoder main circuit driving voltage that is output by the internal power supply 11 is, e.g., 1 [V], the overvoltage breakdown prevention circuit 13 generates an abnormality detection unit driving voltage of about 1 [V], based on the voltage (e.g., 5 [V]) that is output by the main power supply 10, and outputs the abnormality detection unit driving voltage.

In this manner, according to the first embodiment, even when the main power supply 10 that supplies power to the abnormality detection unit 14 and the internal power supply 11 that supplies power to the encoder main circuit 12 are short-circuited, since the abnormality detection unit driving voltage that is output from the overvoltage breakdown prevention circuit 13 is regulated to a voltage having a substantially equal magnitude to the encoder main circuit driving voltage that is output from the internal power supply 11 and a potential difference between these two voltages is small, overvoltage is not supplied to the encoder main circuit 12 and the breakdown of an electronic component constituting the encoder main circuit can be prevented.

The abnormality detection unit 14 is driven by using the abnormality detection unit driving voltage that is output from the overvoltage breakdown prevention circuit 13, monitors the encoder driving voltage that is output from the internal power supply 11, and detects an abnormality relating to the internal power supply 11. For example, when the encoder driving voltage is greater than a predetermined upper-limit threshold, the abnormality detection unit 14 determines that an abnormality occurred in the internal power supply 11, and outputs an internal power supply alarm signal to the shutoff circuit 15. For example, when short-circuit occurred between the main power supply 10 and the internal power supply 11, there is a possibility that the encoder driving voltage becomes greater than the predetermined upper-limit threshold. In this case, the abnormality detection unit 14 outputs the internal power supply alarm signal to the shutoff circuit 15. In addition, as an option, also when the encoder driving voltage is less than a predetermined lower-limit threshold, the abnormality detection unit 14 may determine that an abnormality occurred in the internal power supply 11, and may output an internal power supply alarm signal to the shutoff circuit 15. The abnormality detection unit 14 may be composed of a combination of an analog circuit and an arithmetic processing unit, or may be composed of only an arithmetic processing unit, or may be composed of only an analog circuit. Arithmetic processing units, which can constitute the abnormality detection unit 14, include, for example, an IC, an LSI, a CPU, an MPU, and a DSP. For example, when the abnormality detection unit 14 is constituted in a software program form, the arithmetic processing unit is operated according to the software program, and thereby the function of the abnormality detection unit 14 can be implemented. Alternatively, a semiconductor integrated circuit or a storage medium, in which a software program that implements the function of the abnormality detection unit 14 is written, may be constructed.

The shutoff circuit 15 is provided between the internal power supply 11 and the encoder main circuit 12. The shutoff circuit 15 can recognize that the abnormality detection unit 14 detected an abnormality, by receiving the internal power supply alarm signal from the abnormality detection unit 14. At the time of the abnormality detection by the abnormality detection unit 14, the shutoff circuit 15 shuts off the supply of the encoder main circuit driving voltage to the encoder main circuit 12 by the internal power supply 11. At such an abnormal time that the internal power supply 11 outputs overvoltage, since the shutoff circuit 15 shuts off the supply of the encoder main circuit driving voltage to the encoder main circuit 12 by the internal power supply 11, overvoltage is not supplied to the encoder main circuit 12 and the breakdown of an electronic component constituting the encoder main circuit can be prevented. The shutoff circuit 15 is composed of, for example, a semiconductor switching element, a relay or the like. Examples of the semiconductor switching element include an FET, an IGBT, a thyristor, a GTO (Gate Turn-OFF thyristor), and a transistor, but the semiconductor switching element may be some other semiconductor switching element.

Next, an encoder according to a second embodiment of the present disclosure is described with reference to FIG. 2 to FIG. 4.

Figure 2:
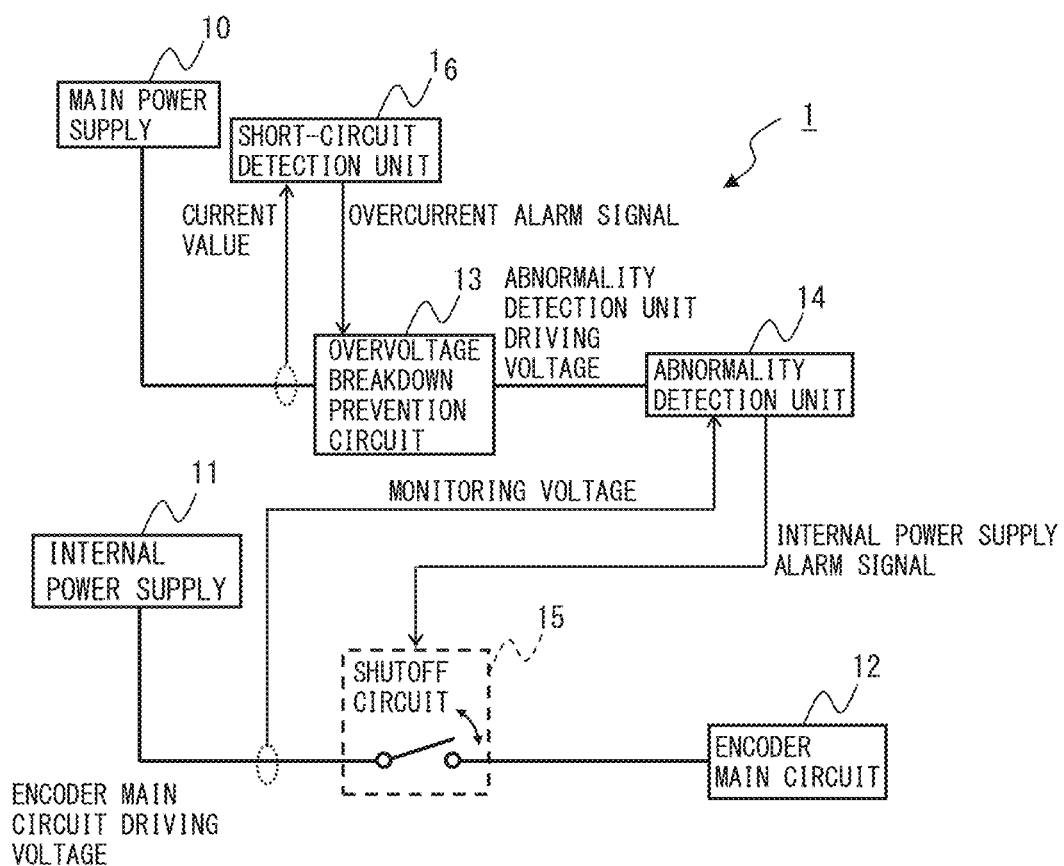
FIG. 2 is a view illustrating an encoder according to a second embodiment of the present disclosure.

FIG. 2 is a view illustrating the encoder according to the second embodiment of the present disclosure.

An encoder 1 according to the second embodiment of the present disclosure drives, at a normal time, the abnormality detection unit 14 by the voltage supplied from the main power supply 10, and drives, when short-circuit occurred between the main power supply 10 and the internal power supply 11, the abnormality detection unit 14 by the abnormality detection unit driving voltage having a substantially equal magnitude to the encoder main circuit driving voltage. Thus, the encoder 1 according to the second embodiment of the present disclosure further includes a short-circuit detection unit 16, in addition to the configuration of the encoder 1 according to the first embodiment described with reference to FIG. 1.

The structures and operations of the main power supply 10, internal power supply 11, encoder main circuit 12 and shutoff circuit 15 in the first embodiment are similar to those in the first embodiment described with reference to FIG. 1.

The short-circuit detection unit 16 detects the presence/absence of short-circuit between the main power supply 10 and the internal power supply 11. If short-circuit occurs between the main power supply 10 and the internal power supply 11, overcurrent flows from the main power supply 10 toward the overvoltage breakdown prevention circuit 13. Thus, when overcurrent occurred in the current from the main power supply 10, since there is a possibility of the occurrence of short-circuit between the main power supply 10 and the internal power supply 11, the short-circuit detection unit 16 outputs an overcurrent alarm signal to the overvoltage breakdown prevention circuit 13. The short-circuit detection unit 16 may be composed of a combination of an analog circuit and an arithmetic processing unit, or may be composed of only an arithmetic processing unit, or may be composed of only an analog circuit. Arithmetic processing units, which can constitute the short-circuit detection unit 16, include, for example, an IC, an LSI, a CPU, an MPU, and a DSP. For example, when the short-circuit detection unit 16 is constituted in a software program form, the arithmetic processing unit is operated according to the software program, and thereby the function of the short-circuit detection unit 16 can be implemented. Alternatively, a semiconductor integrated circuit or a storage medium, in which a software program that implements the function of the short-circuit detection unit 16 is written, may be constructed.

The overvoltage breakdown prevention circuit 13 can recognize that the short-circuit detection unit 16 detected an abnormality, by receiving the overcurrent alarm signal from the short-circuit detection unit 16. When the overvoltage breakdown prevention circuit 13 received the overcurrent alarm signal from the short-circuit detection unit 16, the overvoltage breakdown prevention circuit 13 generates an abnormality detection unit driving voltage having a substantially equal magnitude to the encoder main circuit driving voltage, based on the voltage supplied from the main power supply 10, and outputs the abnormality detection unit driving voltage. When the short-circuit detection unit 16 does not detect a short-circuit, the overvoltage breakdown prevention circuit 13 outputs an abnormality detection unit driving voltage having a substantially equal magnitude to the voltage supplied from the main power supply 10. For example, if the voltage that is output by the main power supply 10 is 5 [V] and the voltage that is output by the internal power supply 11 is 3.3 [V], the abnormality detection unit driving voltage that the overvoltage breakdown prevention circuit 13 outputs is 3.3 [V] when the short-circuit detection unit 16 detected short-circuit, and is 5 [V] when the short-circuit detection unit 16 does not detect short-circuit.

The abnormality detection unit 14 is driven by using the abnormality detection unit driving voltage that is output from the overvoltage breakdown prevention circuit 13, monitors the encoder driving voltage that is output from the internal power supply 11, and detects an abnormality relating to the internal power supply 11. In the second embodiment, the abnormality detection unit driving voltage, which is output from the overvoltage breakdown prevention circuit 13, is a voltage having a substantially equal magnitude to the encoder main circuit driving voltage when the short-circuit detection unit 16 detected short-circuit, and is a voltage having a substantially equal magnitude to the voltage supplied from the main power supply 10 when the short-circuit detection unit 16 does not detect short-circuit. The abnormality detection unit 14 is configured to be capable of being driven by each of the voltage having a substantially equal magnitude to the encoder main circuit driving voltage and the voltage having a substantially equal magnitude to the voltage supplied from the main power supply 10.

In this manner, according to the second embodiment, even when the main power supply 10 that supplies power to the abnormality detection unit 14 and the internal power supply 11 that supplies power to the encoder main circuit 12 are short-circuited, since the abnormality detection unit driving voltage, which is output from the overvoltage breakdown prevention circuit 13 at the time of short-circuit between the main power supply 10 and the internal power supply 11, is regulated to a voltage having a substantially equal magnitude to the encoder main circuit driving voltage that is output from the internal power supply 11 and a potential difference between these two voltages is small, overvoltage is not supplied to the encoder main circuit 12 and the breakdown of an electronic component constituting the encoder main circuit can be prevented. According to the second embodiment, the abnormality detection unit driving voltage having a substantially equal magnitude to the encoder main circuit driving voltage is output only when short-circuit occurs between the main power supply 10 and the internal power supply 11, and the abnormality detection unit driving voltage having a substantially equal magnitude to the voltage supplied from the main power supply 10 is output in other cases, and therefore there is also an advantage that the power consumption of the main power supply 10 can be reduced.

Figure 3:
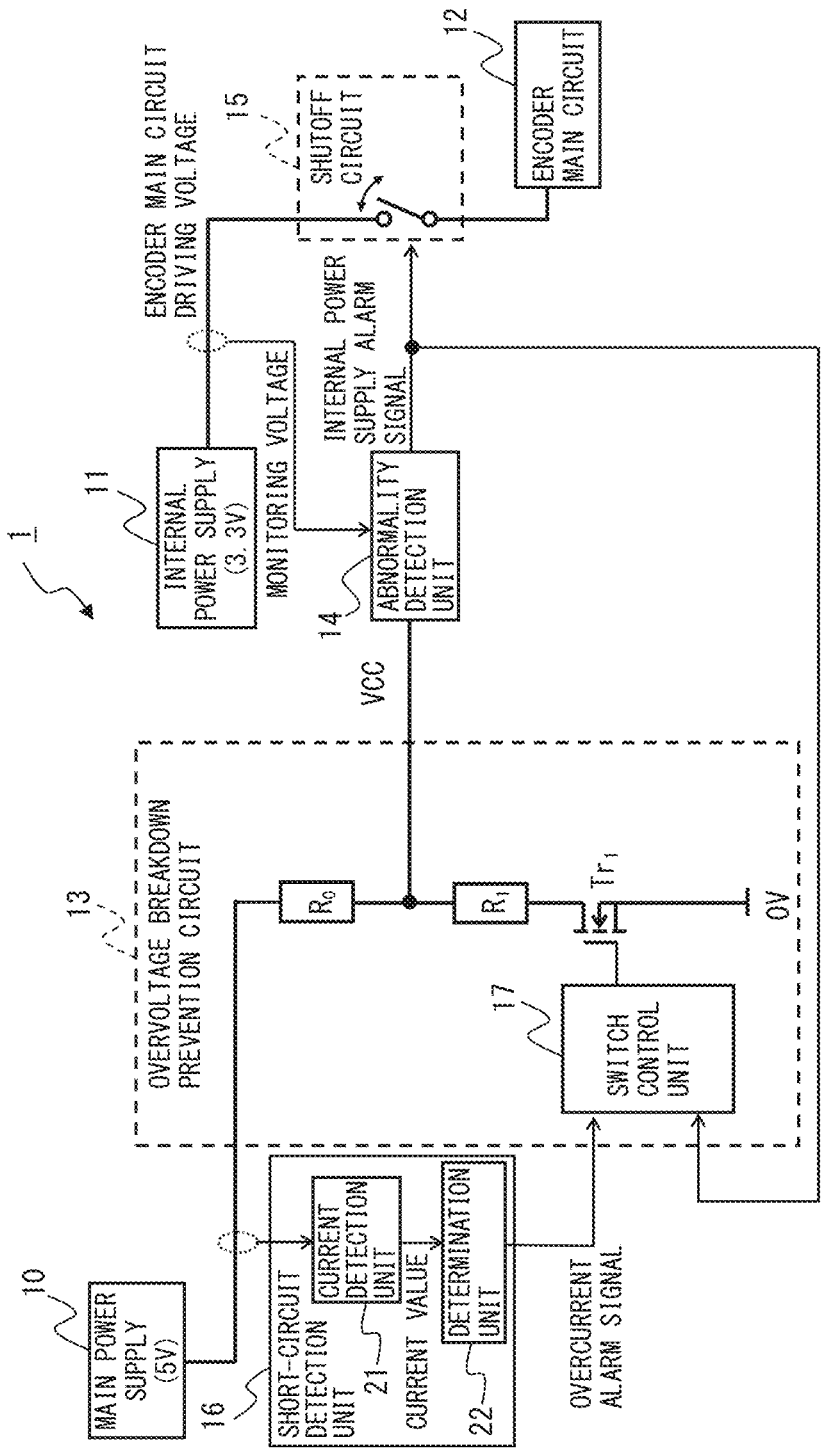
FIG. 3 is a view illustrating a concrete example of a short-circuit detection unit and an overvoltage breakdown prevention circuit in the encoder according to the second embodiment of the present disclosure.

FIG. 3 is a view illustrating a concrete example of the short-circuit detection unit and the overvoltage breakdown prevention circuit in the encoder according to the second embodiment of the present disclosure. In the example illustrated in FIG. 3, by way of example, the voltage that is output by the main power supply 10 is set at 5 [V], and the voltage that is output by the internal power supply 11 is set at 3.3 [V].

If short-circuit occurs between the main power supply 10 and the internal power supply 11, overcurrent flows from the main power supply 10 toward the overvoltage breakdown prevention circuit 13. In order to detect the occurrence of overcurrent of the main power supply 10, the short-circuit detection unit 16 includes a current detection unit 21 and a determination unit 22.

The current detection unit 21 detects the value of the current supplied from the main power supply 10. As a current detection method in the current detection unit 21, for example, a method using a shunt resistor is known. In this method, a shunt resistor is inserted between the main power supply 10 and the overvoltage breakdown prevention circuit 13, a current path between which is a target of current detection, and a potential difference between both ends of the shunt resistor, which occurs when current flows through the shunt resistor, is detected, and a current value is detected based on this voltage. The value of current detected by the current detection unit 21 is sent to the determination unit 22.

The determination unit 22 determines whether overcurrent occurs in the current supplied from the main power supply 10, based on whether the value of current detected by the current detection unit 21 is a predetermined threshold or more. When the value of current detected by the current detection unit 21 is the predetermined threshold or more, there is a possibility that the main power supply 10 and the internal power supply 11 are short-circuited, and thus the determination unit 22 outputs the overcurrent alarm signal to a switch control unit 17 in the overvoltage breakdown prevention circuit 13. When the value of current detected by the current detection unit 21 is less than the predetermined threshold, the determination unit 22 determines that the main power supply 10 and the internal power supply 11 are not short-circuited. The determination unit 22 is composed of, for example, an AD converter and a comparator. The threshold used in the determination process of the occurrence of overcurrent in the determination unit 22 needs to be acquired in advance before the actual operation of the encoder 1. The threshold is set at, for example, a value that is greater by several-ten percent or more than a value of current flowing at a normal time, but the value of the threshold can freely be changed.

The overvoltage breakdown prevention circuit 13 is configured to convert the input voltage to a voltage of a different magnitude, and to output the voltage of the different magnitude, and is composed of, for example, a voltage-division resistor, a voltage regulator or the like. In the example illustrated in FIG. 3, a case is illustrated in which the overvoltage breakdown prevention circuit 13 is constituted by using the voltage-division resistor.

As illustrated in FIG. 3, the overvoltage breakdown prevention circuit 13 includes a resistor $R_0$, a resistor $R_1$, a switch $Tr_1$ and a switch control unit 17. A set including the resistor $R_0$, resistor $R_1$ and switch $Tr_1$, which are connected in series, is connected to the main power supply 10. A connection point between the resistor $R_0$ and the resistor $R_1$ is connected to the abnormality detection unit 14. The resistance values of the resistor $R_0$ and the resistor $R_1$ are set such that a potential VCC of the connection point between the resistor $R_0$ and the resistor $R_1$, which occurs by the flow of current through the resistor $R_0$ and resistor $R_1$ from the main power supply 10 when the switch $Tr_1$ is turned on, has a magnitude of voltage (e.g., about 3.3 [V]) that is substantially equal to the voltage of the internal power supply 11. Examples of the switch $Tr_1$ include an FET, an IGBT, a thyristor, a GTO (Gate Turn-OFF thyristor), and a transistor, but the switch $Tr_1$ may be some other semiconductor switching element.

The ON/OFF of the switch $Tr_1$ is controlled by the switch control unit 17. Specifically, the switch control unit 17 turns on the switch $Tr_1$ when the switch control unit 17 received the overcurrent alarm signal from the short-circuit detection unit 16 and received the internal power supply alarm signal from the abnormality detection unit 14. In this case, since current flows also in the resistor $R_1$, 3.3 [V] that is a voltage obtained by dividing the voltage of 5 [V] of the main power supply 10 by the resistor $R_0$ and the resistor $R_1$, appears as the potential VCC of the connection point between the resistor $R_0$ and the resistor $R_1$. Thus, 3.3 [V] is supplied as a driving voltage to the abnormality detection unit 14. When the switch control unit 17 does not receive the overcurrent alarm signal from the short-circuit detection unit 16, the switch control unit 17 turns off the switch $Tr_1$. In this case, since current does not flow in the resistor $R_1$, a voltage of 5 [V] that is substantially equal to the voltage supplied from the main power supply 10 appears as the potential VCC of the connection point between the resistor $R_0$ and the resistor $R_1$. Thus, 5 [V] is supplied as a driving voltage to the abnormality detection unit 14.

Figure 4:
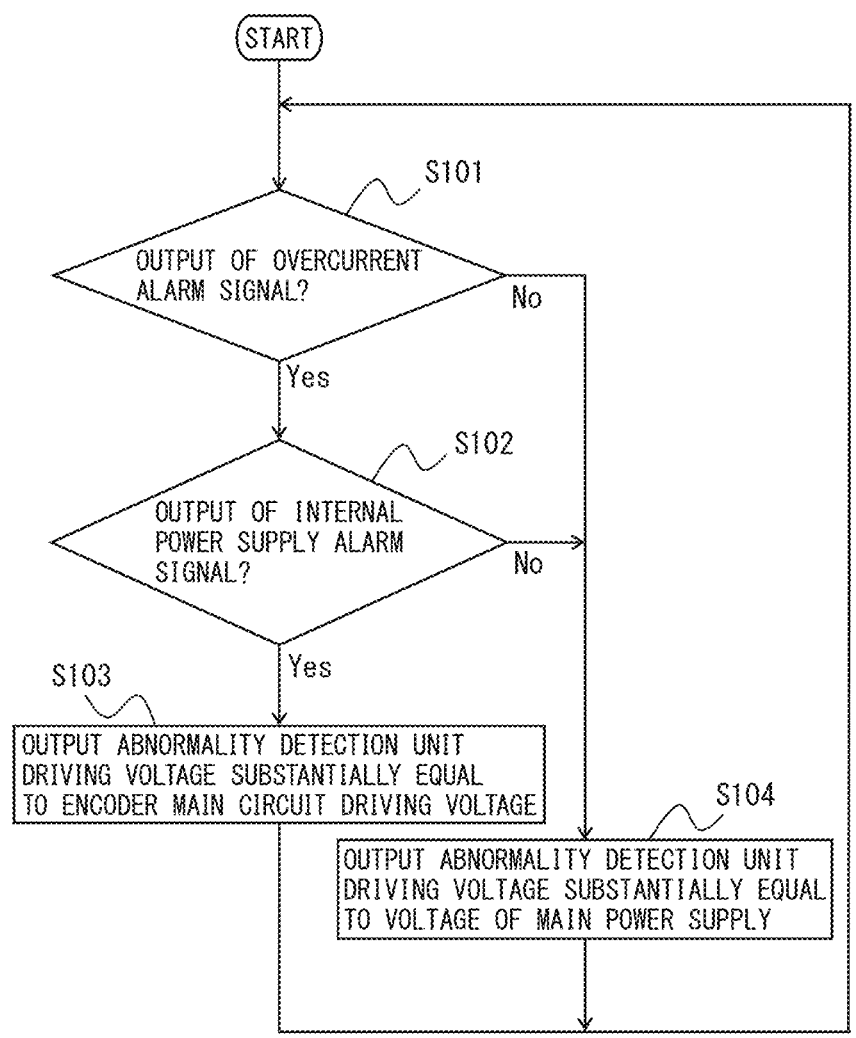
FIG. 4 is a flowchart illustrating an operation flow of the short-circuit detection unit and the overvoltage breakdown prevention circuit in the encoder illustrated in FIG. 3.

FIG. 4 is a flowchart illustrating an operation flow of the short-circuit detection unit and the overvoltage breakdown prevention circuit in the encoder illustrated in FIG. 3. FIG. 4 omits an illustration of a process of generating the rotation information of the rotary body in the encoder main circuit 12. The process of steps S101 to S104 is repeatedly executed in predetermined cycles.

To start with, in step S101, the switch control unit 17 in the overvoltage breakdown prevention circuit 13 determines whether the overcurrent alarm signal was output from the short-circuit detection unit 16.

When it is determined in step S101 that the overcurrent alarm signal is not output from the short-circuit detection unit 16, the switch control unit 17 turns off the switch $Tr_1$. In this case, since current does not flow in the resistor $R_1$, the overvoltage breakdown prevention circuit 13 outputs the abnormality detection unit driving voltage having a magnitude (5 [V]) substantially equal to the voltage supplied from the main power supply 10 (step S104).

When it is determined in step S101 that the overcurrent alarm signal was output from the short-circuit detection unit 16, the process advances to step S102.

In step S102, the switch control unit 17 in the overvoltage breakdown prevention circuit 13 determines whether the internal power supply alarm signal was output from the abnormality detection unit 14.

When it is determined in step S102 that the internal power supply alarm signal is not output from the abnormality detection unit 14, the switch control unit 17 turns off the switch $Tr_1$. In this case, since current does not flow in the resistor $R_1$, the overvoltage breakdown prevention circuit 13 outputs the abnormality detection unit driving voltage having a magnitude (5 [V]) substantially equal to the voltage supplied from the main power supply 10 (step S104). Then, the process returns to step S101.

When it is determined in step S102 that the internal power supply alarm signal was output from the abnormality detection unit 14, the switch control unit 17 turns on the switch $Tr_1$. In this case, since current flows also in the resistor $R_1$, 3.3 [V] that is a voltage obtained by dividing the voltage of 5 [V] of the main power supply 10 by the resistor $R_0$ and the resistor $R_1$, appears as the potential VCC of the connection point between the resistor $R_0$ and the resistor $R_1$, and, in other words, the overvoltage breakdown prevention circuit 13 generates and outputs the abnormality detection unit driving voltage having a substantially equal magnitude (3.3 [V]) to the encoder main circuit driving voltage (step S103) and outputs it. Thereafter, the process returns to step S101. As long as the internal power supply alarm signal is being output from the abnormality detection unit 14, the overvoltage breakdown prevention circuit 13 continues outputting the abnormality detection unit driving voltage having a substantially equal magnitude (3.3 [V]) to the encoder main circuit driving voltage. For example, as an option, when the main power supply 10 is turned off and then turned on once again, the output from the overvoltage breakdown prevention circuit 13 may be reset, and the abnormality detection unit driving voltage having a substantially equal magnitude (5 [V]) to the voltage supplied from the main power supply 10 may be output.

Next, an encoder according to a third embodiment of the present disclosure is described with reference to FIG. 5 to FIG. 7. In the third embodiment, a plurality of internal power supplies are provided in the encoder according to the second embodiment.

Figure 5:
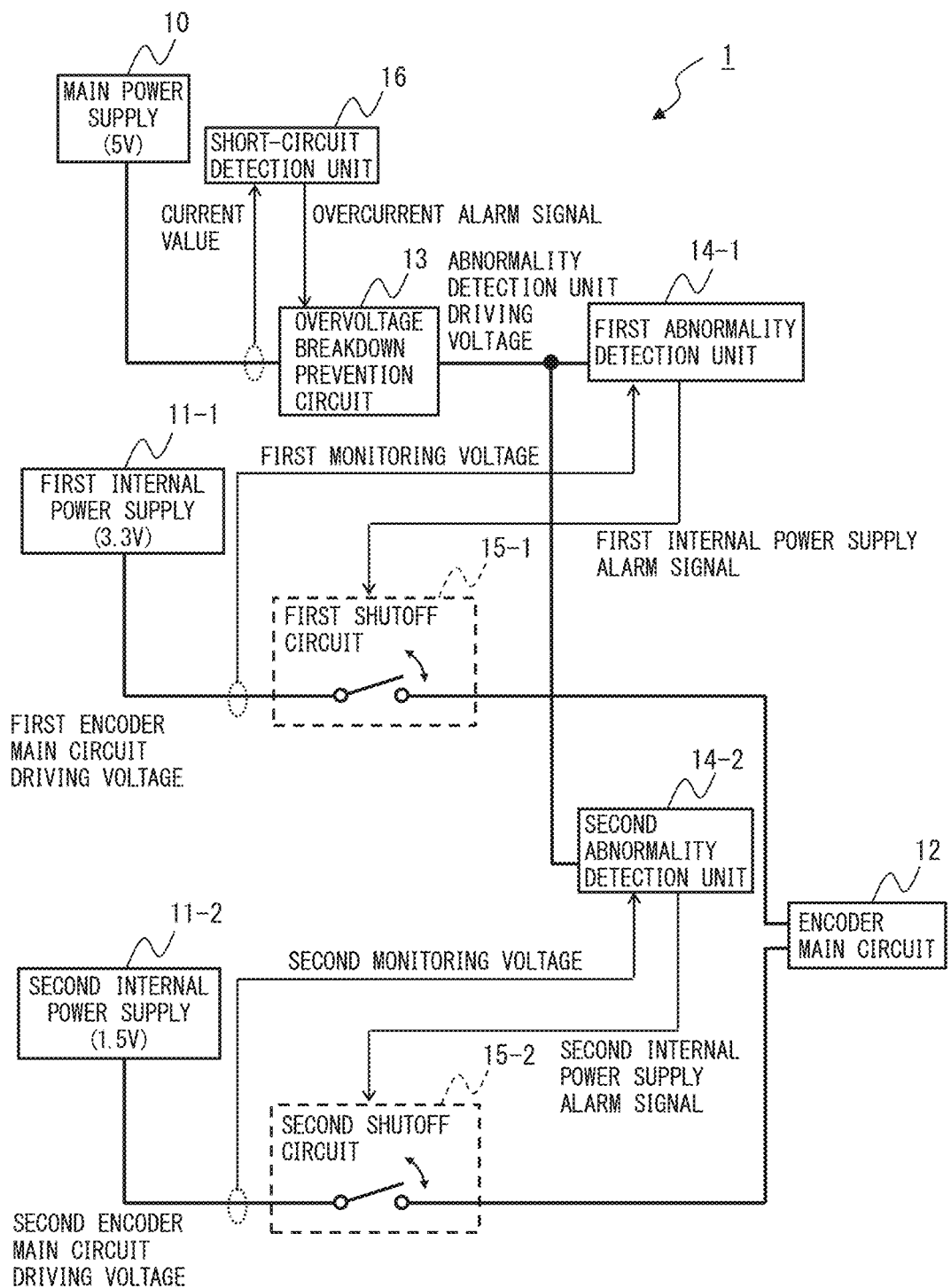
FIG. 5 is a view illustrating an encoder according to a third embodiment of the present disclosure.

FIG. 5 is a view illustrating the encoder according to the third embodiment of the present disclosure. Here, in the example illustrated in FIG. 5 and in FIG. 6 and FIG. 7 to be described later, an encoder 1 including two internal power supplies is described by way of example, but the following description is also applicable to an example in which the encoder 1 includes three or more internal power supplies. In addition, the structures and operations of the main power supply 10, encoder main circuit 12 and short-circuit detection unit 16 in the third embodiment are similar to those in the second embodiment described with reference to FIG. 2.

As illustrated in FIG. 5, the encoder 1 according to the third embodiment includes a first internal power supply 11-1 and a second internal power supply 11-2. The first internal power supply 11-1 and second internal power supply 11-2 generate encoder main circuit driving voltages having mutually different magnitudes and output them. A structure example of each of the first internal power supply 11-1 and second internal power supply 11-2 is the same as the structure example of the internal power supply 11 described with reference to FIG. 1. In the example illustrate in FIG. 5, by way of example, the first internal power supply 11-1 outputs 3.3 [V], and the second internal power supply 11-2 outputs 1.5 [V].

A first abnormality detection unit 14-1 and a second abnormality detection unit 14-2 are provided in association with the first internal power supply 11-1 and the second internal power supply 11-2. A structure example of each of the first abnormality detection unit 14-1 and second abnormality detection unit 14-2 is the same as the structure example of the abnormality detection unit 14 described with reference to FIG. 1. The first abnormality detection unit 14-1 is driven by using the abnormality detection unit driving voltage that is output from the overvoltage breakdown prevention circuit 13, monitors the encoder driving voltage that is output from the first internal power supply 11-1, and detects an abnormality relating to the first internal power supply 11-1. The second abnormality detection unit 14-2 is driven by using the abnormality detection unit driving voltage that is output from the overvoltage breakdown prevention circuit 13, monitors the encoder driving voltage that is output from the second internal power supply 11-2, and detects an abnormality relating to the second internal power supply 11-2.

A first shutoff circuit 15-1 is provided between the first internal power supply 11-1 and the encoder main circuit 12, and a second shutoff circuit 15-2 is provided between the second internal power supply 11-2 and the encoder main circuit 12. A structure example of each of the first shutoff circuit 15-1 and second shutoff circuit 15-2 is the same as the structure example of the shutoff circuit 15 described with reference to FIG. 1. At the time of the abnormality detection by the first abnormality detection unit 14-1, the first shutoff circuit 15-1 shuts off the supply of the encoder main circuit driving voltage to the encoder main circuit 12 by the first internal power supply 11-1. At the time of the abnormality detection by the second abnormality detection unit 14-2, the second shutoff circuit 15-2 shuts off the supply of the encoder main circuit driving voltage to the encoder main circuit 12 by the second internal power supply 11-2.

When the short-circuit detection unit 16 detected short-circuit, the overvoltage breakdown prevention circuit 13 generates, based on the voltage supplied from the main power supply 10, an abnormality detection unit driving voltage having a substantially equal magnitude to the encoder main circuit driving voltage that is output by the internal power supply in which an abnormality was detected by the abnormality detection unit, and outputs the abnormality detection unit driving voltage. Specifically, when the short-circuit detection unit 16 detected short-circuit and the first abnormality detection unit 14-1 detected an abnormality of the first internal power supply 11-1, the overvoltage breakdown prevention circuit 13 generates, based on the voltage supplied from the main power supply 10, an abnormality detection unit driving voltage having a substantially equal magnitude (about 3.3 [V]) to the encoder main circuit driving voltage that is output by the first internal power supply, and outputs the abnormality detection unit driving voltage. When the short-circuit detection unit 16 detected short-circuit and the second abnormality detection unit 14-2 detected an abnormality of the second internal power supply 11-2, the overvoltage breakdown prevention circuit 13 generates, based on the voltage supplied from the main power supply 10, an abnormality detection unit driving voltage having a substantially equal magnitude (about 1.5 [V]) to the encoder main circuit driving voltage that is output by the second internal power supply, and outputs the abnormality detection unit driving voltage. The first abnormality detection unit 14-1 and second abnormality detection unit 14-2 are configured to be capable of being driven by the voltage of any one of magnitudes of 5 [V], 3.3. [V] and 1.5 [V], which are the abnormality detection unit driving voltages that are output from the overvoltage breakdown prevention circuit 13.

In this manner, according to the third embodiment, even when the main power supply 10 and one of a plurality of internal power supplies 11-1 and 11-2 are short-circuited, the abnormality detection unit driving voltage that is output from the overvoltage breakdown prevention circuit 13 is regulated to a voltage having a substantially equal magnitude to the encoder main circuit driving voltage that is output from the internal power supply, in which an abnormality was detected, and a potential difference between the main power supply 10 and the internal power supply in which an abnormality was detected is small, and thus overvoltage is not supplied to the encoder main circuit 12 and the breakdown of an electronic component constituting the encoder main circuit can be prevented. According to the third embodiment, the abnormality detection unit driving voltage having a substantially equal magnitude to the encoder main circuit driving voltage is output only when short-circuit occurs between the main power supply 10 and the internal power supply in which an abnormality was detected, and the abnormality detection unit driving voltage having a substantially equal magnitude to the voltage supplied from the main power supply 10 is output in other cases, and therefore there is also an advantage that the power consumption of the main power supply 10 can be reduced.

Figure 6:
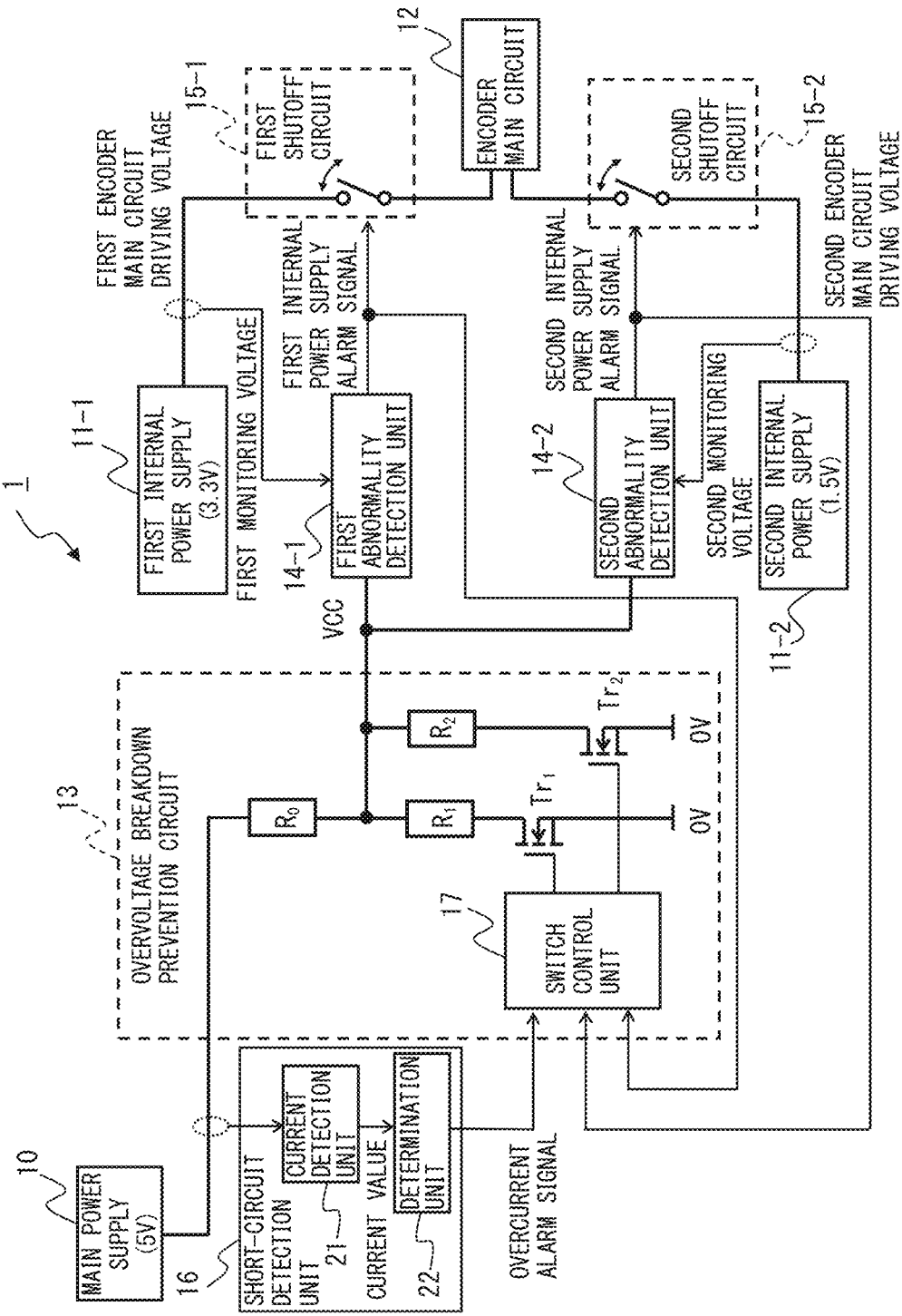
FIG. 6 is a view illustrating a concrete example of a short-circuit detection unit and an overvoltage breakdown prevention circuit in the encoder according to the third embodiment of the present disclosure.

FIG. 6 is a view illustrating a concrete example of the short-circuit detection unit and the overvoltage breakdown prevention circuit in the encoder according to the third embodiment of the present disclosure. In the example illustrated in FIG. 6, by way of example, the voltage that is output by the main power supply 10 is set at 5 [V], the voltage that is output by the first internal power supply 11-1 is set at 3.3 [V], and the voltage that is output by the second internal power supply 11-2 is set at 1.5 [V], but these voltages may have other magnitudes.

In order to detect the occurrence of overcurrent of the main power supply 10, the short-circuit detection unit 16 includes a current detection unit 21 and a determination unit 22. A structure example of the short-circuit detection unit 16 is the same as the structure example of the short-circuit detection unit 16 described with reference to FIG. 2 and FIG. 3.

The overvoltage breakdown prevention circuit 13 is configured to convert the input voltage to a voltage of a different magnitude, and to output the voltage of the different magnitude, and is composed of, for example, a voltage-division resistor, a voltage regulator or the like. In the example illustrated in FIG. 6, a case is illustrated in which the overvoltage breakdown prevention circuit 13 is constituted by using the voltage-division resistor.

As illustrated in FIG. 6, the overvoltage breakdown prevention circuit 13 includes a resistor $R_0$, a resistor $R_1$, a resistor $R_2$, a switch $Tr_1$, a switch $Tr_2$, and a switch control unit 17. A set including the resistor $R_1$ and the switch $Tr_1$, and a set including the resistor $R_2$ and the switch $Tr_2$, are connected in parallel. In addition, a set including the resistor $R_1$, switch $Tr_1$, resistor $R_2$ and switch $Tr_2$, and the resistor $R_0$, are connected in series to the main power supply 10. Connection points between the resistor $R_0$, on one hand, and the resistor $R_1$ and resistor $R_2$, on the other hand, are connected to the first abnormality detection unit 14-1 and second abnormality detection unit 14-2, respectively. The resistance values of the resistor $R_0$ and the resistor $R_1$ are set such that a potential VCC of the connection point between the resistor $R_0$ and the resistor $R_1$, which occurs by the flow of current through the resistor $R_0$ and resistor $R_1$ from the main power supply 10 when the switch $Tr_1$ is turned on and the switch $Tr_2$ is turned off, has a magnitude of voltage (e.g., about 3.3 [V]) that is substantially equal to the voltage of the first internal power supply 11-1. The resistance values of the resistor $R_0$ and the resistor $R_2$ are set such that a potential VCC of the connection point between the resistor $R_0$ and the resistor $R_2$, which occurs by the flow of current through the resistor $R_0$ and resistor $R_2$ from the main power supply 10 when the switch $Tr_1$ is turned off and the switch $Tr_2$ is turned on, has a magnitude of voltage (e.g., about 1.5 [V]) that is substantially equal to the voltage of the second internal power supply 11-2. Examples of the switch $Tr_1$ and switch $Tr_2$ include an FET, an IGBT, a thyristor, a GTO (Gate Turn-OFF thyristor), and a transistor, but the switch $Tr_1$ and switch $Tr_2$ may be some other semiconductor switching elements.

The ON/OFF of the switch $Tr_1$ and switch $Tr_2$ is controlled by the switch control unit 17. Specifically, the switch control unit 17 turns on the switch $Tr_1$ and turns off the switch $Tr_2$ when the switch control unit 17 received the overcurrent alarm signal from the short-circuit detection unit 16 and received the first internal power supply alarm signal from the first abnormality detection unit 14-1. In this case, since current flows also in the resistor $R_1$, 3.3 [V] that is a voltage obtained by dividing the voltage of 5 [V] of the main power supply 10 by the resistor $R_0$ and the resistor $R_1$, appears as the potential VCC of the connection point between the resistor $R_0$ and the resistor $R_1$. In other words, 3.3 [V] is supplied as a driving voltage to the first abnormality detection unit 14-1 and second abnormality detection unit 14-2. Specifically, the switch control unit 17 turns off the switch $Tr_1$ and turns on the switch $Tr_2$ when the switch control unit 17 received the overcurrent alarm signal from the short-circuit detection unit 16 and the second internal power supply alarm signal from the second abnormality detection unit 14-2. In this case, since current flows also in the resistor $R_2$, 1.5 [V] that is a voltage obtained by dividing the voltage of 5 [V] of the main power supply 10 by the resistor $R_0$ and the resistor $R_2$, appears as the potential VCC of the connection point between the resistor $R_0$ and the resistor $R_2$. In other words, 1.5 [V] is supplied as a driving voltage to the first abnormality detection unit 14-1 and second abnormality detection unit 14-2.

Figure 7:
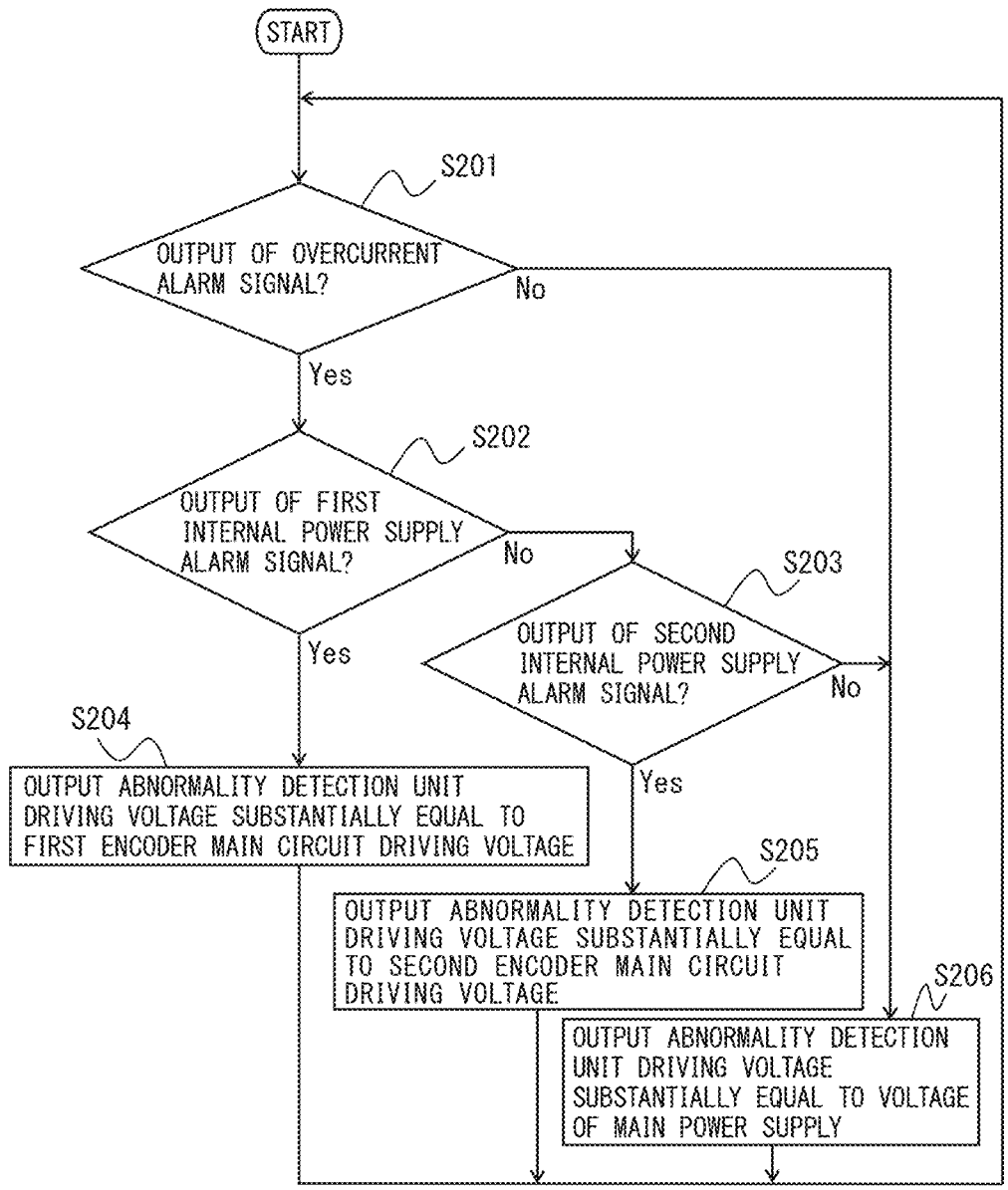
FIG. 7 is a flowchart illustrating an operation flow of the short-circuit detection unit and the overvoltage breakdown prevention circuit in the encoder illustrated in FIG. 6.

FIG. 7 is a flowchart illustrating an operation flow of the short-circuit detection unit and the overvoltage breakdown prevention circuit in the encoder illustrated in FIG. 6. FIG. 7 omits an illustration of a process of generating the rotation information of the rotary body in the encoder main circuit 12. The process of steps S201 to S206 is repeatedly executed in predetermined cycles.

To start with, in step S201, the switch control unit 17 in the overvoltage breakdown prevention circuit 13 determines whether the overcurrent alarm signal was output from the short-circuit detection unit 16.

When it is determined in step S201 that the overcurrent alarm signal is not output from the short-circuit detection unit 16, the switch control unit 17 turns off the switch $Tr_1$ and the switch $Tr_2$. In this case, since current does not flow in the resistor $R_1$ or resistor $R_2$, the overvoltage breakdown prevention circuit 13 outputs the abnormality detection unit driving voltage having a magnitude (5 [V]) substantially equal to the voltage supplied from the main power supply 10 (step S206). Then, the process returns to step S201.

When it is determined in step S201 that the overcurrent alarm signal was output from the short-circuit detection unit 16, the process advances to step S202.

In step S202, the switch control unit 17 in the overvoltage breakdown prevention circuit 13 determines whether the first internal power supply alarm signal was output from the first abnormality detection unit 14-1.

When it is determined in step S202 that the first internal power supply alarm signal was output from the first abnormality detection unit 14-1, the switch control unit 17 turns on the switch $Tr_1$ and turns off the switch $Tr_2$. In this case, since current flows in the resistor $R_1$, 3.3 [V] that is a voltage obtained by dividing the voltage of 5 [V] of the main power supply 10 by the resistor $R_0$ and the resistor $R_1$, appears as the potential VCC of the connection point between the resistor $R_0$ and the resistor $R_1$, and, in other words, the overvoltage breakdown prevention circuit 13 generates the abnormality detection unit driving voltage having a substantially equal magnitude (3.3 [V]) to the first encoder main circuit driving voltage that is output by the first internal power supply 11-1 (step S204), and outputs the abnormality detection unit driving voltage. Then, the process returns to step S201. As long as the first internal power supply alarm signal is being output from the first abnormality detection unit 14-1, the overvoltage breakdown prevention circuit 13 continues outputting the abnormality detection unit driving voltage having a substantially equal magnitude (3.3 [V]) to the first encoder main circuit driving voltage. For example, as an option, when the main power supply 10 is turned off and then turned on once again, the output from the overvoltage breakdown prevention circuit 13 may be reset, and the abnormality detection unit driving voltage having a substantially equal magnitude (5 [V]) to the voltage supplied from the main power supply 10 may be output.

When it is not determined in step S202 that the first internal power supply alarm signal was output from the first abnormality detection unit 14-1, the process advances to step S203.

In step S203, the switch control unit 17 in the overvoltage breakdown prevention circuit 13 determines whether the second internal power supply alarm signal was output from the second abnormality detection unit 14-2.

When it is determined in step S203 that the second internal power supply alarm signal was output from the second abnormality detection unit 14-2, the switch control unit 17 turns off the switch $Tr_1$ and turns on the switch $Tr_2$. In this case, since current flows in the resistor $R_2$, 1.5 [V] that is a voltage obtained by dividing the voltage of 5 [V] of the main power supply 10 by the resistor $R_0$ and the resistor $R_2$, appears as the potential VCC of the connection point between the resistor $R_0$ and the resistor $R_2$, and, in other words, the overvoltage breakdown prevention circuit 13 generates the abnormality detection unit driving voltage having a substantially equal magnitude (1.5 [V]) to the second encoder main circuit driving voltage that is output by the second internal power supply 11-2, and outputs the abnormality detection unit driving voltage (step S205). Then, the process returns to step S201. As long as the second internal power supply alarm signal is being output from the second abnormality detection unit 14-2, the overvoltage breakdown prevention circuit 13 continues outputting the abnormality detection unit driving voltage having a substantially equal magnitude (1.5 [V]) to the second encoder main circuit driving voltage. For example, as an option, when the main power supply 10 is turned off and then turned on once again, the output from the overvoltage breakdown prevention circuit 13 may be reset, and the abnormality detection unit driving voltage having a substantially equal magnitude (5 [V]) to the voltage supplied from the main power supply 10 may be output.

When it is not determined in step S203 that the second internal power supply alarm signal was output from the second abnormality detection unit 14-2, the switch control unit 17 turns off the switch $Tr_1$ and the switch $Tr_2$. In this case, since no current flows in the resistor $R_1$ or resistor $R_2$, the overvoltage breakdown prevention circuit 13 outputs the abnormality detection unit driving voltage having a magnitude (5 [V]) substantially equal to the voltage supplied from the main power supply 10 (step S206). Then, the process returns to step S101.

Note that the process including step S202 and step S204 and the process including step S203 and S205 may executed by changing the order of these processes.

REFERENCE SIGNS LIST

1 Encoder
10 Main power supply
11 Internal power supply
11-1 First internal power supply
11-2 Second internal power supply
12 Encoder main circuit
13 Overvoltage breakdown prevention circuit
14 Abnormality detection unit
14-1 First abnormality detection unit
14-2 Second abnormality detection unit
15 Shutoff circuit
15-1 First shutoff circuit
15-2 Second shutoff circuit
16 Short-circuit detection unit
17 Switch control unit
21 Current detection unit
22 Determination unit

The invention claimed is:

1. An encoder comprising:
at least one internal power supply configured to generate an encoder main circuit driving voltage and output the encoder main circuit driving voltage;
an encoder main circuit configured to be driven by using the encoder main circuit driving voltage supplied from the internal power supply, and to generate rotation information of a rotary body;
an overvoltage breakdown prevention circuit configured to generate an abnormality detection unit driving voltage, based on a voltage supplied from a main power supply, and output the abnormality detection unit driving voltage;
an abnormality detection unit configured to be driven by using the abnormality detection unit driving voltage that is output from the overvoltage breakdown prevention circuit, and to detect an abnormality relating to the internal power supply; and
a shutoff circuit configured to shut off supply of the encoder main circuit driving voltage to the encoder main circuit by the internal power supply, at a time of abnormality detection by the abnormality detection unit.

2. The encoder according to claim 1, wherein the overvoltage breakdown prevention circuit is configured to generate the abnormality detection unit driving voltage having a substantially equal magnitude to the encoder main circuit driving voltage, based on the voltage supplied from the main power supply and output the abnormality detection unit driving voltage.

3. The encoder according to claim 1, further comprising a short-circuit detection unit configured to detect presence or absence of short-circuit between the main power supply and the internal power supply, wherein
when the short-circuit detection unit detects short-circuit, the overvoltage breakdown prevention circuit generates, based on the voltage supplied from the main power supply, the abnormality detection unit driving voltage having a substantially equal magnitude to the encoder main circuit driving voltage, and outputs the abnormality detection unit driving voltage, and
when the short-circuit detection unit does not detect short-circuit, the overvoltage breakdown prevention circuit generates and outputs the abnormality detection unit driving voltage having a substantially equal magnitude to the voltage supplied from the main power supply, and outputs the abnormality detection unit driving voltage.

4. The encoder according to claim 3, wherein when the short-circuit detection unit detects short-circuit, the overvoltage breakdown prevention circuit generates, based on the voltage supplied from the main power supply, the abnormality detection unit driving voltage having a substantially equal magnitude to the encoder main circuit driving voltage that is output by the internal power supply in which an abnormality was detected by the abnormality detection unit, and outputs the abnormality detection unit driving voltage.

5. The encoder according to claim 3, wherein the short-circuit detection unit includes:
   a current detection unit configured to detect a value of a current supplied from the main power supply; and
   a determination unit configured to determine that the main power supply and the internal power supply are short-circuited when the value of the current detected by the current detection unit is a predetermined threshold or more, and to determine that the main power supply and the internal power supply are not short-circuited when the value of the current detected by the current detection unit is less than the predetermined threshold.

6. The encoder according to claim 1, wherein
   a plurality of the internal power supplies generate encoder main circuit driving voltages having mutually different magnitudes and output them, and
   a plurality of the abnormality detection units are provided in association with the internal power supplies.

7. The encoder according to claim 1, wherein the internal power supply is configured to generate and output the encoder main circuit driving voltage, based on the voltage supplied from the main power supply, and output the encoder main circuit driving voltage.

* * * * *